Jan. 25, 1938.  A. V. PETERSEN  2,106,556
ALTERNATING CURRENT APPARATUS
Filed Feb. 27, 1937  2 Sheets-Sheet 1
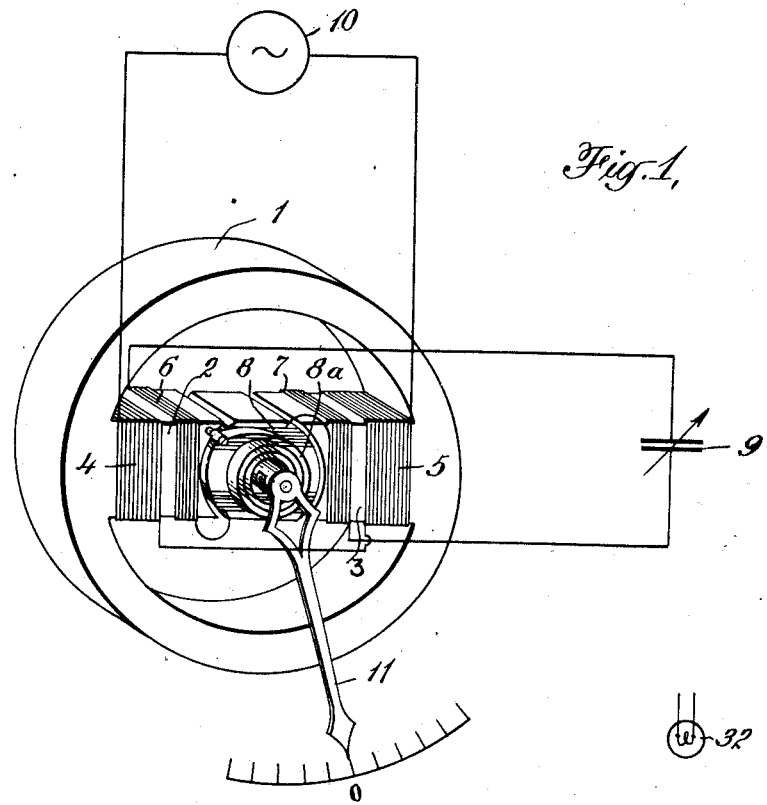
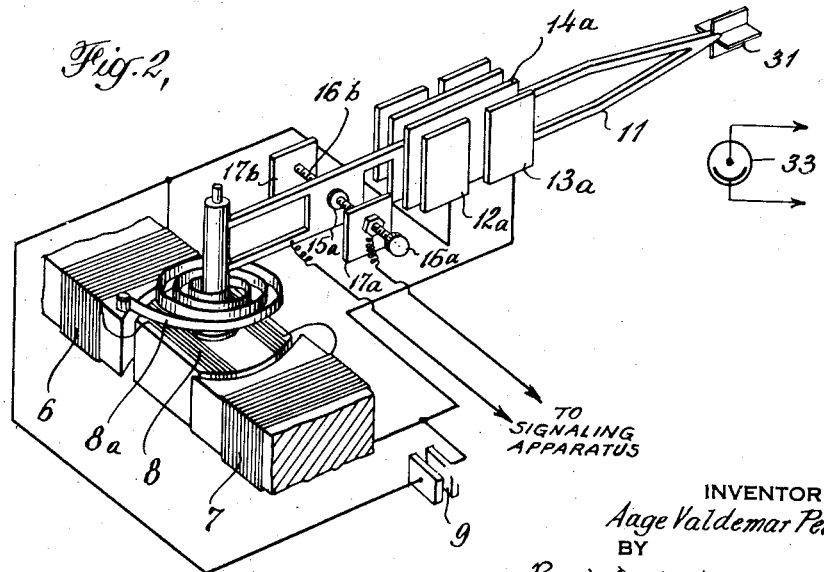
INVENTOR
Aage Valdemar Petersen
BY
Pennie, Davis, Marvin and Edmonds.
ATTORNEYS

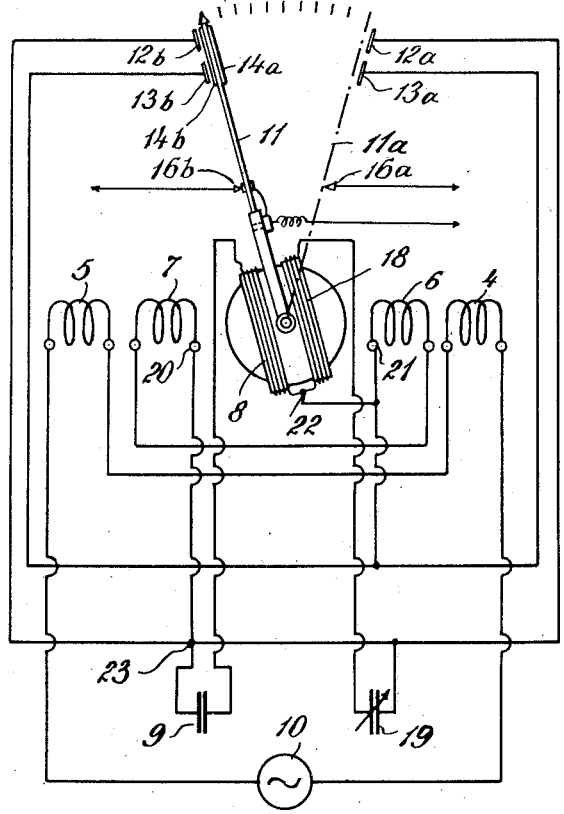
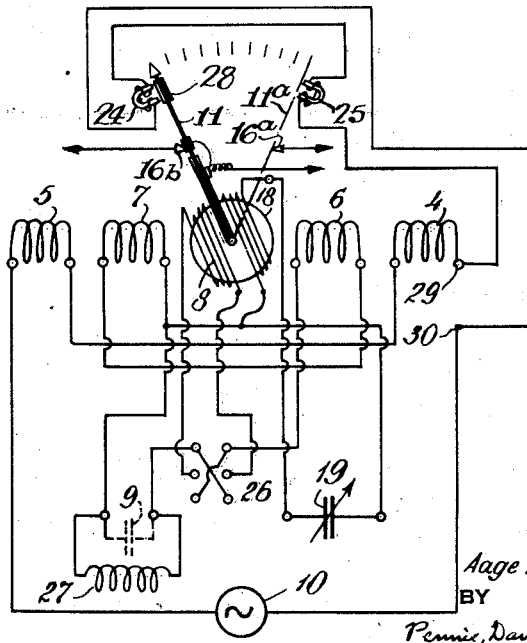

Patented Jan. 25, 1938

2,106,556

UNITED STATES PATENT OFFICE 2,106,556

ALTERNATING CURRENT APPARATUS

Aage Valdemar Petersen, Copenhagen, Denmark, assignor to F. L. Smidth & Company, New York, N. Y., a corporation of New Jersey Application February 27, 1937, Serial No. 128,141
In Great Britain January 14, 1936

8 Claims. (Cl. 175—183)

The present invention relates to alternating current deflectional instruments responsive to capacitive and inductive reactances, such as instruments for measuring or indicating the values of such reactances, and especially to alternating current relays whose operation is dependent upon the value of such reactances. The invention resides in means for improving the accuracy of the indications and the reliability and positiveness of operation of such instruments.

The principal object of the invention is to eliminate the effect on the response of such instruments due to partial short-circuiting of or leakage in the capacity or inductance upon which the operation depends. For example, if a deflection on an instrument is desired, corresponding to the change of capacity which takes place when a condenser of known capacity is lowered into material with a certain dielectric constant, even a slight leakage between the condenser plates may upset the reading of the change in capacity, if the indicator responds to a current in phase with the voltage producing the current through the capacity.

According to the present invention, this disadvantage is avoided by employing an electromotive force derived from a winding linked with the magnetic field acting on the moving coil of the instrument, for the purpose of generating the current passing through the moving coil and the capacitive or inductive reactance in question, so that the electromotive force and the electromagnetic flux of the field are relatively displaced by 90 degrees in phase.

In these circumstances, the current passing through the moving coil, in phase with the voltage producing the current, will not develop any torque, whereas current which, due to its passage through the capacitive or inductive reactance, is displaced in phase in relation to the voltage, and consequently has a component at 90 degrees relative to that voltage, will develop a torque.

As the torques acting on such a moving-coil instrument are normally very small, the instrument should be fitted with a moving coil which can be very easily moved, which means, however, that casual effects from the outside, such as vibrations, may cause undesired deflection of the moving coil. It may, therefore, be expedient in cases in which the instrument has to respond to variations of capacity or inductance of a preselected amount, to keep the moving coil or its pointer in the zero or normal position in order to avoid such "false" deflections, in which cases, the pointer does not deflect until the torque has attained a certain minimum value. This, for instance, may be done by holding the pointer in position under the effect of a suitable electrostatic, electromagnetic or permanent magnetic field which it has first to overcome before the actual deflection takes place.

Similarly, it may be expedient to hold the moving coil or its pointer in the deflected position in cases where, for example, it is only a matter of perceiving that the apparatus has made a large deflection, or where it is desired to let the deflection of the pointer serve the purpose of closing a contact, which, of course, requires a certain contact pressure. The electrostatic or magnetic field for keeping the moving coil in one or the other position is produced advantageously by means of the same source of voltage which operates the moving coil, or by means of a similar source of voltage in synchronism with it. In the first place, this should be a source of voltage suitably large for the purpose, and secondly, the relation between the field which tends to keep the pointer in one position or another and the torque acting on the moving coil should not be affected by casual variations in the source of voltage supplying the moving-coil instrument.

As aforesaid, such an instrument will be excellently suited for closing or opening a circuit when the reactance for which it gives a deflection has attained a certain preselected value. As, however, the torques acting on the coil of the instrument are small, the instrument may, instead of actuating a contact directly, be fitted with a shutter on the pointer, which upon moving, cuts off or allows illumination access to a photo-sensitive device which in turn may control relay apparatus in a manner well known.

From the foregoing it will be apparent that the instrument is well suited for remote indication of the positions of movable mechanical objects such as dampers, and of the level or height of liquids and pulverized materials. Likewise, it may be employed to indicate actual or change of pressures, specific gravities, and velocities of air, steam or liquids. Variations in such positions or quantities may, for example, by mechanical connection to an adjustable condenser, be converted into capacity variations which will be measured or indicated by the instrument of the present invention. Similar variations in capacity will result from a change in dielectric as by more or less immersion of the condenser plates.

If the instrument is to be used as a measuring device and consequently is intended only to give a deflection corresponding to the inductive or capacitive reactance to be measured or if it is to be used as a sensitive relay, it should be compensated for its self-capacitance or self-inductance. This is preferably done by providing the moving coil with a further winding by which the moving coil is subjected to a torque equal and opposite to the torque exerted on the coil due to self-capacitance or self-inductance of the first-named winding of the moving coil.

The apparatus is also suited for the measurement of dielectric constants, especially for dielectrics of low conductivity. Further, in the case of materials of known dielectric constant, the instrument can be used for indirect measurement of the proportion of moisture in the material, as will be evident from the more detailed description hereinafter.

In order that the invention may be clearly understood and readily carried into effect, some examples of construction in accordance therewith will now be described with reference to the accompanying drawings, in which:—

Fig. 1 shows diagrammatically a moving-coil instrument according to the invention, as well as the source of voltage, and the capacitive reactance to be measured or to cause operation of the instrument;

Fig. 2 is an enlarged diagrammatic view of the moving coil and pointer assembly of the instrument;

Fig. 3 is a diagram of connections, showing how the apparatus is compensated for its self-capacitance and self-inductance.

Fig. 4 is a modification of Fig. 3 arranged to measure inductance or capacitance.

In Fig. 1 an annular iron yoke 1 is shown connecting two pole pieces 2 and 3. These pole pieces carry the primary windings 4 and 5 respectively, which are connected in series to a source of alternating current 10 and which are so wound that they set up lines of force in the same direction through the two windings forming a magnetic field between the two pole-pieces. The pole pieces are further provided with the secondary windings 6 and 7 connected in series with the moving coil 8 and with the capacitive reactance 9. It will now be seen that the magnetic flux between the pole pieces, produced by the current in the primary windings 4, 5 will be 90 degrees out of phase in relation to the voltage in the secondary windings 6, 7. That component of the current passing through the moving coil which is in phase with the secondary voltage consequently will not develop any torque in the coil, but a torque will be developed only by that component of the current in the secondary windings which is 90 degrees displaced in phase in relation to the voltage in these windings, due to the inductive or capacitive reactance, this component of the secondary current being thus in phase with, or 180 degrees out of phase with, the magnetic field.

Figure 2 shows only the secondary windings 6 and 7 on the pole pieces. The moving coil is shown at 8 with its coiled restoring spring 8a which provides a torque balancing that developed by the electromagnetic flux. The moving system is provided with a pointer 11, to which a condenser plate 14a is fixed. Rigidly connected with the instrument are the condenser plates 12a and 13a, which are connected respectively to the two secondary windings. The plates 12a and 13a will consequently attract the plate 14a, thus exerting a force to retain the pointer against a stop.

In order to regulate the deflected position of the pointer and to avoid a short-circuit between the condenser plates 12a and 13a on one hand and 14a on the other hand, the pointer is provided with a stop 15a which abuts against a set screw 16a turning in a threaded plate 17a which is rigidly connected with the instrument. A similar stop-screw assembly 16b, 17b may be placed on the other side of the pointer to regulate the zero or normal position. The stop 15a and screws 16a and 17a may carry contacts of suitable material connected to external circuits which may include signaling apparatus, as indicated, to operate alarms or other devices.

The vane or shutter 31 at the end of the pointer 11 is provided to interrupt a light beam from a light-source 32 for the control of external apparatus through the medium of a photo-sensitive device 33 or the like, in the well known manner. Such an arrangement may be required if the current which operates the instrument is too small to actuate the mechanical contacts satisfactorily. In this event the effectiveness of the pointer-retaining device, whether electrostatic or magnetic, could be reduced, or the device might be disconnected altogether, depending on the circumstances. Upon occasion the mechanical contacts and the photo-sensitive device control can be used simultaneously.

Fig. 3 shows the indicator compensated for the self-inductance and self-capacitance of the moving coil to increase the accuracy when the instrument is to be used as a sensitive relay for measuring capacitance, for example. Means are also shown for retaining the pointer in the normal position 11 and in the deflected position 11a should this feature be desired.

The primary circuit is, as shown in Fig. 1, from the source of current 10 through the windings 4 and 5 which are on the pole pieces not shown in Fig. 3. The secondary windings 6 and 7 are connected in series with the capacitive reactance 9 to be measured and to the moving coil 8, the circuit passing from 7 to 20, 23, 9, 8, 22, 21 to 6 and back to 7. Apart from the capacitive reactance 9, the circuit through the windings 6, 7 and 8 will possess a certain self-capacitance and self-inductance which together will exert a certain torque on the moving coil 8. For compensating that effect a second moving coil 18, and an adjustable condenser 19 are inserted in parallel with the above-named circuit, this parallel circuit being from 7 to 20, 23, 19, 18, 22, 21 to 6 and back to 7. The part of the secondary current which is led through the condenser 19 will be displaced in phase by 90 degrees in relation to the voltage and will exert a certain torque on the moving coil 18 which, if the coil 18 is properly connected, will be in opposite direction to the torque exerted by the self-capacitance or the self-inductance on the moving system through the winding 8. By adjusting the condenser 19, the magnitude of the torque exerted on the coil 18 can be made exactly equal to the torque exerted on the coil 8 due to its self-capacitance. It may be noted that the adjusted capacity of condenser 19 will usually be greater than the capacity of condenser 9.

The indicator is fitted with condenser plates 12b, 13b and 14b for retaining the pointer in the zero or normal position, and with plates 12a, 13a and 14a for retaining the pointer in the deflected position. The retaining circuit is from 7 to 20, 23, and condenser 12a, 14a, 13a (or 12b, 14b 13b) 21, 6 and 7. The plates 14a and 14b which are secured to either side of the pointer may be coated with mica on the outside, so that short-circuiting of the condensers is impossible.

Fig. 4 differs from the arrangement of Fig. 3 chiefly in two respects, namely, provision is made for measuring inductance as well as capacitance, and magnetic retaining means for the pointer have been substituted for the electrostatic retaining means shown in Fig. 3. Similar reference characters have the same significance in these, as well as in the other figures. In Fig. 4 the inductance 27 has been substituted for the condenser 9 (shown in dotted lines) as the unknown to be measured. A reversing switch 26, in the circuit of the moving coil 8 is provided to allow the moving coil and pointer to be deflected always in the desired direction, it being obvious that without the reversing switch the pointer would be deflected in one direction when a capacitance 9 is being measured and in the opposite direction when an inductance 27 is being measured. In the alternative, the instrument could be arranged for deflection in both directions and so be provided with a center-zero scale, such as indicated in Fig. 1.

The pointer-retaining means in Fig. 4 comprises electromagnets 24 and 25 which are energized from the primary circuit by being connected in series therewith at terminals 29 and 30. These magnets cooperate with armature 28 of magnetic material secured to the pointer 11. If these retaining means are not desired a switch may be connected to shirt-circuit the terminals 29, 30. Similarly, the electrostatic retaining plates 12a, 12b, 13a, 13b of Figs. 2 and 3 may be omitted or disconnected, as desired. Instead of employing electromagnets 24, 25 permanent magnets of suitable magnetic strength may be employed.

In the form of construction as shown in Figs. 3 and 4, the indicator is suitable for use as a sensitive relay. The pointer is deflected at an exact preselected value, and, in its deflected position, retaining means provide the necessary contact pressure by the electrostatic or magnetic action exerted in this position. The retaining means may, of course, be employed on either one or both sides of the pointer in any of the described arrangements. Contacts, or a light-intercepting vane may be employed as in Fig. 2.

I claim:

1. In an alternating-current deflectional instrument, a primary circuit including a primary winding for connection to a fixed alternating-current supply line, a secondary circuit including in series a secondary winding, a moving coil and a reactance subject to variation, said secondary winding and said moving coil being magnetically coupled to said primary winding, the current in said reactance being only that induced by said primary winding, a pointer attached to said moving coil and movable therewith in two directions, and capacitive means retaining said pointer against movement in either direction until said reactance attains a preselected value.

2. In an alternating-current deflectional instrument, a primary circuit including a primary winding for connection to a fixed alternating-current supply line, a secondary circuit including in series a secondary winding, a moving coil and a reactance subject to variation, said secondary winding and said moving coil being magnetically coupled to said primary winding, the current in said reactance being only that induced by said primary winding, a pointer attached to said moving coil and movable therewith in two directions, and magnetic means retaining said pointer against movement in either direction until said reactance attains a preselected value.

3. In combination with a reactance, an alternating-current deflectional instrument comprising a primary circuit including a primary coil wound in two sections on two opposite field poles respectively, a secondary circuit including a secondary coil wound in two sections on said two field poles respectively, a moving coil wound on a movable member, said secondary coil, said moving coil and said reactance being connected in series, and said secondary coil and said moving coil being magnetically coupled to said primary coil, and a compensating circuit connected across said secondary coil and including in series an adjustable condenser and a compensating coil wound on said movable member symmetrically with respect to said moving coil.

4. In combination with a reactance, an alternating-current deflectional instrument comprising, a primary circuit including a primary coil wound in two sections on two opposite field poles respectively, a secondary circuit including a secondary coil wound in two sections on said two field poles respectively, a moving coil wound on a movable member, said secondary coil, said moving coil and said reactance being connected in series, said secondary coil and said moving coil being magnetically coupled to said primary coil, a compensating circuit connected across said secondary coil and including in series an adjustable condenser and a compensating coil wound on said movable member symmetrically with respect to said moving coil, and a reversing switch to reverse the polarity of said moving coil with respect to the windings of said secondary coil.

5. In an alternating-current deflectional instrument responsive alternatively to an inductive and a capacitive reactance, a primary circuit including a primary coil wound in two sections on two opposite field poles respectively, a secondary circuit including a secondary coil wound in two sections on said two field poles respectively, a moving coil wound on a movable member, said secondary coil, said moving coil and said reactance being connected in series, said secondary coil and said moving coil being magnetically coupled to said primary coil, a compensating circuit connected across said secondary coil and including in series an adjustable condenser and a compensating coil wound on said movable member symmetrically with respect to said moving coil, and a reversing switch to reverse the polarity of said moving coil with respect to the windings of said secondary coil, whereby the moving coil may be deflected in the same direction in response to either type of reactance.

6. In an alternating-current deflectional instrument, a primary circuit including a primary winding for connection to a fixed alternating-current supply line, a secondary circuit including in series an unknown reactance, a secondary winding inductively coupled to said primary winding and a moving coil secured to a movable member, and a compensating circuit including a second moving coil secured to said movable member and a second reactance in series with said second moving coil and with said secondary winding, said moving coils being inductively coupled to said primary winding, and said second reactance being adjustable to balance the reactances of said first moving coil and of said unknown reactance.

7. In an alternating-current deflectional instrument, a primary circuit including a primary winding for connection to a source of fixed alternating-current voltage, and a secondary circuit including in series a secondary winding, a reactance and a moving coil, said secondary winding and said moving coil being magnetically coupled to said primary winding, the current through said reactance and said moving coil being only that induced by said primary winding, whereby the deflection of said moving coil is in proportion to the value of said reactance and is independent of the ohmic resistance of said reactance.

8. In an alternating-current deflectional instrument, a primary circuit including a primary winding for connection to a fixed alternating-current supply line, a secondary circuit including in series a secondary winding, a reactance subject to variation and a moving coil, said secondary winding and said moving coil being magnetically coupled to said primary winding, the current through said reactance and said moving coil being only that induced by said primary winding, a pointer attached to said moving coil to move therewith, a spring against which said pointer moves, and means in addition to said spring retaining said pointer against movement substantially only until said reactance attains a preselected value.

AAGE VALDEMAR PETERSEN.